June 18, 1963 T. W. THOMPSON 3,094,261

TAPE CARRIAGE CONTROL

Filed Jan. 9, 1961 6 Sheets-Sheet 1

INVENTOR
THOMAS W. THOMPSON
BY K. P. Johnson
ATTORNEY

June 18, 1963 T. W. THOMPSON 3,094,261

TAPE CARRIAGE CONTROL

Filed Jan. 9, 1961 6 Sheets-Sheet 3

June 18, 1963 T. W. THOMPSON 3,094,261

TAPE CARRIAGE CONTROL

Filed Jan. 9, 1961 6 Sheets-Sheet 4

June 18, 1963 T. W. THOMPSON 3,094,261

TAPE CARRIAGE CONTROL

Filed Jan. 9, 1961

6 Sheets-Sheet 6

United States Patent Office 3,094,261
Patented June 18, 1963

3,094,261

TAPE CARRIAGE CONTROL

Thomas W. Thompson, Endwell, N.Y., assignor to International Business Machines Corporation, New York, N.Y., a corporation of New York Filed Jan. 9, 1961, Ser. No. 81,387
16 Claims. (Cl. 226—9)

This invention relates to systems for controlling a record feed carriage comprising a record positioning device used in recording machines and, more particularly, to a system for stopping the record feed carriage, advancing a continuous strip of record forms, to position a form at selected recording positions.

Data processed by electronic computers is frequently desired to be in some form of visual presentation. In general, an electromechanical printer is usually provided to present such data on certain types of records. One particular form of visual presentation of common occurrence is selective line printing, wherein printing at selected recorded positions is effected by means controlling the movement of a record feed carriage for advancing a continuous strip of record forms to position a form at selected recording positions opposite suitable recording means.

A representative means presently used for achieving selective line printing is that shown in Bakelaar, et al., U.S. Patent 2,684,746, issued July 27, 1954. Therein a record being advanced by the feeding means is stopped opposite the recording means at a selected line, or recording position, by means of a multi-channel looped control tape combined with selectable tape brushes sensing respective channels of the tape. The control tape, which is driven synchronously with the record, bears stop position indicating holes in selected channels, the holes being spaced along the tape differently in different channels. All that is required to stop the moving record at the desired recording position is to place the proper tape sensing brush in a stop circuit. Sensing of the hole in the tape by the brush will complete the circuit and stop the record in the desired recording position. This control system, however, requires many prepunched channels and a sensing device for each channel.

Therefore, it is a primary object of this invention to provide an improved record feed carriage control system for selective record positioning using a record control tape bearing a single channel of recording position indicia, with a suitable sensing means for detecting the indicia.

Another object is to provide a record feed carriage control system for selective record positioning using a single channel looped control tape bearing recording position indicia for stopping the carriage advance of a continuous strip of record forms, to position a form at selected recording positions.

Still another object is to provide rapid, accurate and reliable means for generating appropriate control signals to define a record feed cycle by comparing a signal representing an approaching recording position on a moving record with a signal representing a selected recording position to receive data from a recording means.

Still another object of this invention is to provide a record feed carriage control system using a single channel control tape for selectively advancing the record in either high or low speed according to the distance the record is to be advanced.

A still further object of this invention is to provide a two speed record feed carriage control system using a single channel control tape to always advance a record at low speed when the advance is to be less than a predetermined distance.

The present invention achieves the practical result of stopping a record, being advanced through a plurality of recording positions by a record feeding means, at selected ones of said positions by providing a detector means comprising a flexible endless member bearing a single channel of indicia corresponding to recording positions on the advancing record and suitable means to sense the indicia for generating a pulse as the record arrives at each of said recording positions. The pulses generated by said detector means are used to operate indicator means serving as a counter, adapted to be advanced by the pulses and to generate an output signal for each of the recording positions indicating the progress of the record. A settable means is provided to preselect a count representative of one of said recording positions to receive recorded data by generating a signal output which will be compared with the output signals or counts from said indicator means by a comparing means. Upon coincidence of the signal from the indicator means with the signal from the settable means, a signal will be generated by the comparing means for operating a means associated with the record feeding means to stop the record at the selected recording position.

There are several advantages of the present invention. One is the simplification of recording position detecting means. Another is the reduction in the number of mechanical components heretofore necessary to sense several tape channels. This further reduces the drag of sensing elements on the endless member bearing the position indicia.

The foregoing and other objects, features and advantages of the invention will be apparent from the following more particular description of embodiments of the invention, as illustrated in the accompanying drawings.

*Single Speed Control System*

Figure 1:
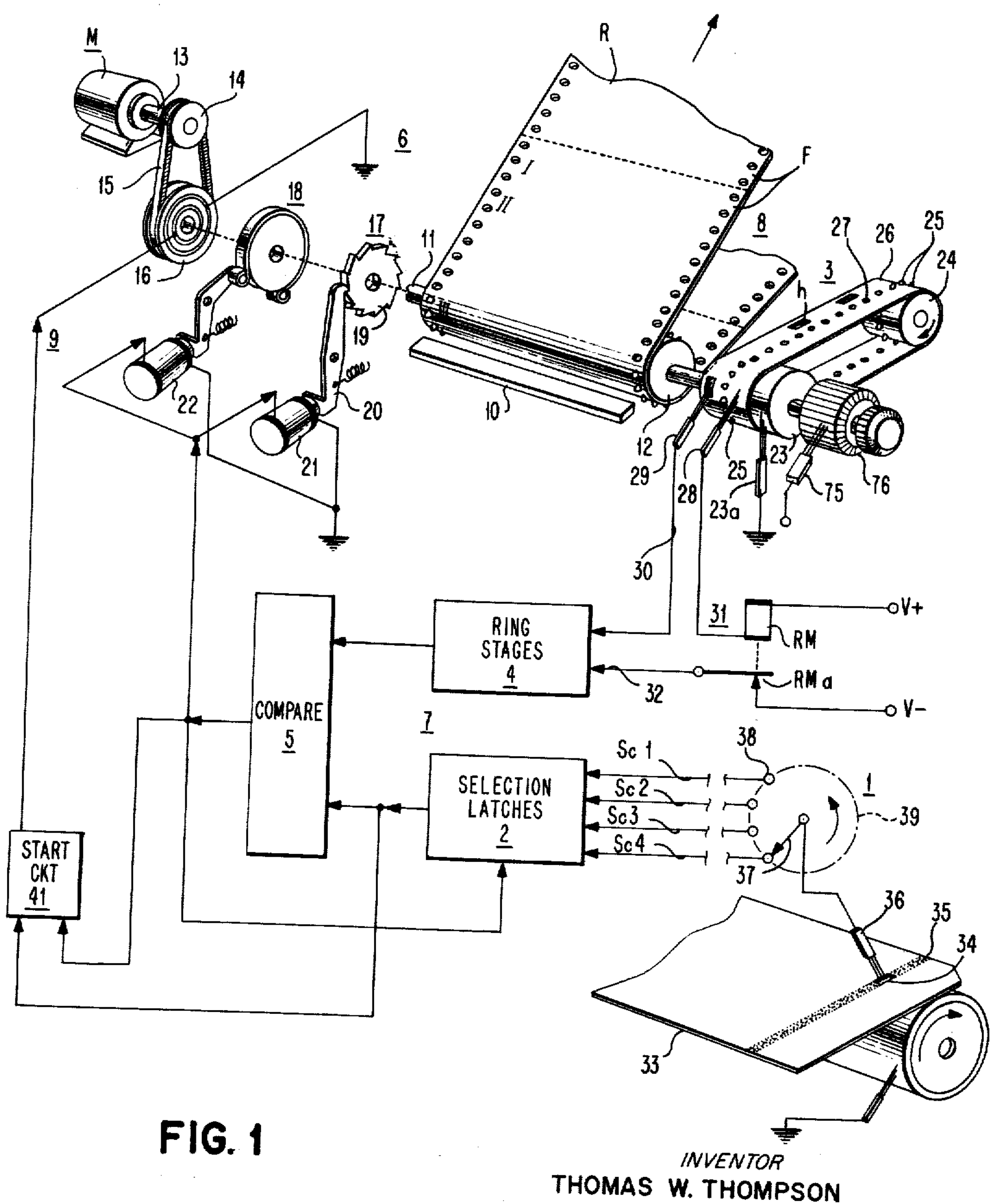
FIGURE 1 is a diagrammatic view illustrating one embodiment of the invention.

Referring to FIG. 1, an embodiment of the present invention is shown, by way of example, as part of an electromechanical printer for stopping the operation of a record feed carriage 8 by means 9 associated with the record positioning device 6. Wrapped about a conventional pin-feed type platen 12 of record feed carriage 8, and engaged with pins thereon for positive advancement, is a continuous record strip R comprising a series of record forms F. Platen 12, fixed on shaft 11 and located before recording means 10, is caused to rotate by a continuously running motor M through clutch 16 on shaft 11. Clutch 16 is connected to pulley 14 on motor shaft 13 by belt 15. Only so much of carriage 8, means 9, and means 10 is shown and described herein as is necessary to appreciate the manner in which selective record positioning is achieved by the invention. A typical record positioning device 6 is shown in a patent to Cunningham, U.S. Patent No. 2,747,717, issued May 29, 1957.

The advancement of record strip R by carriage 8 is stopped positively with a recording position, such as III, in precise alignment with recording means 10 upon energization of magnet 21 and magnet 22 controlling the operation of detent mechanism 17 and brake 18, respectively, associated with carriage feed shaft 11. Printing means 10 may then be actuated to print at the aligned recording position. Components comprising clutch 16, detent 17, and brake 18 are all well-known and may be arranged in any suitable manner by one skilled in the art to utilize their respective functions with the invention. Signals for energizing the clutch, detent, and brake are provided by system 7, as will be presently described.

Figure 3:
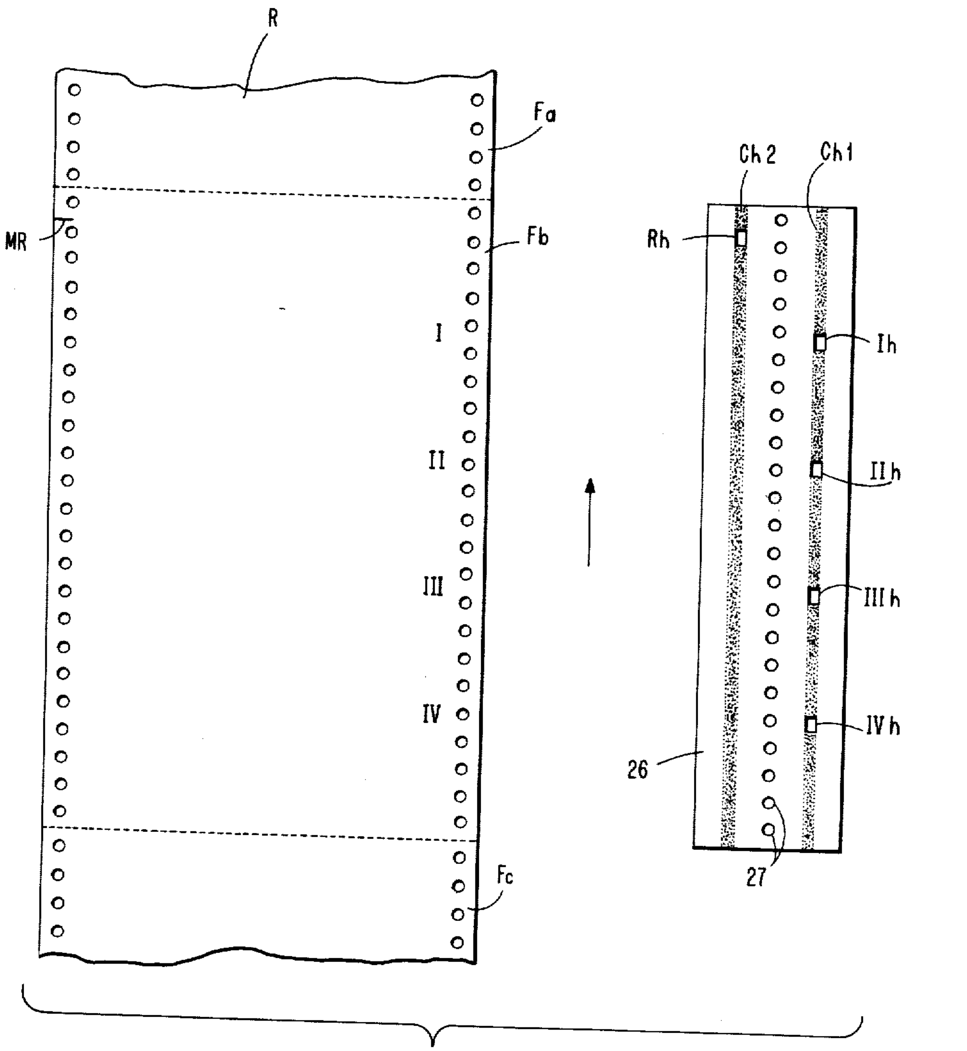
FIGURE 3 is a diagrammatic view showing the relationship between a record and a record loop.

Detector means 3 is provided to generate a pulse as a record F arrives at each recording position. The detector is seen to comprise an endless member of flexible material herein called a record tape loop 26, bearing a single channel *Ch*1 (FIG. 3) of recording position indicating holes *h*, for example, I*h*, II*h*, III*h*, and IV*h*, corresponding with recording positions I, II, III, and IV of form F, and bearing a reset hole R*h* in home channel *Ch*2. Loop 26 is wrapped about a brush contact drum 23 fixed on shaft 11, for synchronous movement therewith by engagement between pins 25 on drum 23 and a line of perforations 27 on loop 26. An adjustable idler pulley 24 maintains tension in loop 26. Though it is assumed that the length of loop 26 is equal to that of a form F, it may in fact be any integral multiple thereof. Further comprising detector 3 is a sensing element, herein called a recording position detector brush 29, for detecting holes *h* and another sensing element, herein called a reset brush 28, for detecting reset hole R*h* in loop 26. Though detector 3 with its reset circuit is shown comprising brushes 29 and 28 sensing holes *h* and R*h*, respectively, aligned in channels *Ch*1 and *Ch*2 of loop 26 and registered and synchronized with the movement of record form F, other equivalent means may be used.

For example, the member bearing recording position indicia and reset indicia can be a strip attached to the form along one edge to be subsequently detached after recording takes place. Alternatively, the indicia bearing member may be a margin of the form and left intact with the form after recording. The indicia may be either holes sensed by brushes or photocells and a light source, or printed marks sensed by photocells and a light source. The marks may ever be printed of an electrically conductive ink or magnetic ink and appropriately sensed. Further, reset indicia and recording position indicia may be located separately, one set of indicia on the form and the other set on a separate tape.

However the indicia may be produced and sensed, it is only necessary that the detector means used be capable of commutator-like action for producing pulses at each recording and reset position. When holes or marks are placed on the form itself, faster carriage acceleration can be obtained because fewer components are required and less inertia is to be overcome for a skip operation.

Form F and loop 26 are manually registered so that reset hole R*h* corresponds with the initial or home position of form F. Then, with platen 12 in a home position, form F of record R may be manually aligned with any suitable reference mark on carriage 8 corresponding with a registration of loop 26. Since loop 26 is assumed equal in length to form F and is described as registered and synchronized therewith, a cycle of loop rotation, corresponding with the advance of one record form F, will result in a pulse generating cycle of detector 3.

Figure 2:
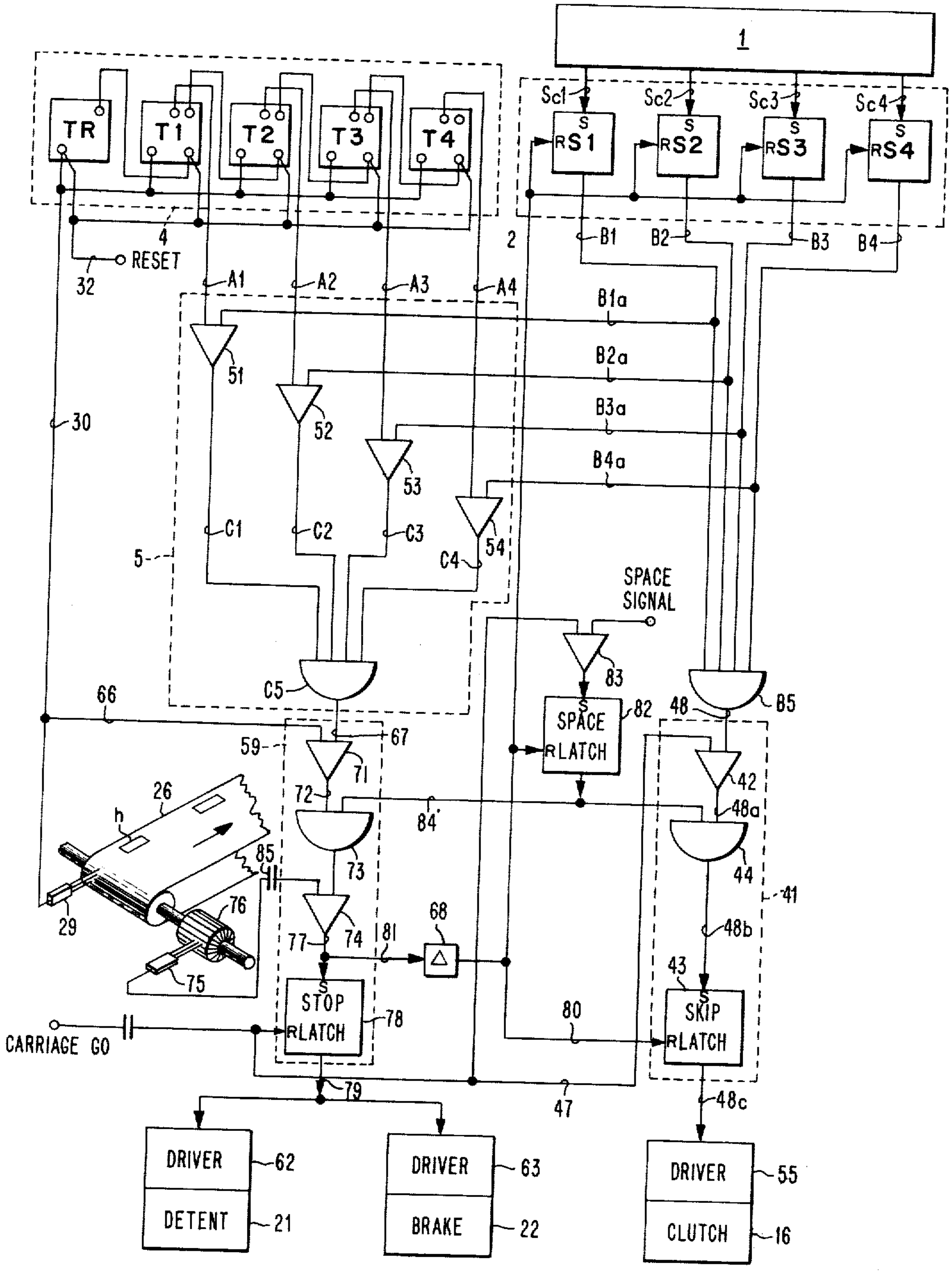
FIGURE 2 is a block diagram of the embodiment of FIG. 1.

The pulses generated by detector means 3 are used to successively advance individual stages of indicator means 4 shown in FIG. 2. Indicator 4 provides a current count of the recording positions arriving at the recording station for each form. This indicator is shown comprising an open ring circuit having a plurality of trigger circuits TR, T1, T2, T3, and T4, of a type shown and described with reference to FIG. 10 in a patent to Weiss et al., U.S. Patent No. 2,884,191, issued April 28, 1959. Trigger TR is the home position stage of the ring, while triggers T1–T4 are the stages providing an input signal to compare network 5. Though only four stages of indicator 4 are shown, it should be understood that the number of such stages is discretionary and will depend on the number of recording positions utilized in a particular application of the invention. A trigger comprised of a pair of cross-connected triodes, is considered "On" when the left-hand tube conducts, and "Off" when the right-hand tube conducts. To form the ring, the plate of the right-hand tube of each lower order stage is coupled through a capacitor to the control grid of the right-hand tube of the subsequent higher order stage, as shown in FIG. 2. A train of negative pulses generated by detector 3 in each cycle of loop rotation is transmitted to indicator 4 on input line 30 coupled through a capacitor to the grid of the left-hand tube of each stage of indicator 4. The effect of an input pulse is to transfer the "On" condition of a stage to the next succeeding stage by well-known trigger action. A typical action would be a case where the ring is in the initial or reset condition with stage TR "On" and stages T1–T4 "Off." A first negative pulse appearing on line 30 pulses all stages simultaneously with no effect on stages T1, T2, T3, and T4 because their left-hand tubes are already cut off. Stage TR is "On," however, and the negative pulse input will cut off the conducting left-hand tube, causing the right-hand tube thereof to conduct. Its plate voltage will drop and be reflected at the control grid of the right-hand tube of stage T1 as a negative pulse to cut off the right-hand tube and thereby cause the left-hand tube to conduct. Stage T1 will be turned "On" as a result. As successive input pulses appear on line 30, the "On" condition of stage T1 will be progressively transferred until the last stage of the ring has been transferred "On." To reset the ring to its initial condition, where TR is "On" and T1–T2 are "Off," a single pulse, generated at brush 28 on sensing hole R*h* (FIG. 3) at the completion of a cycle of loop 26, will cause magnet RM (FIG. 1) of circuit 31 to be energized. A contact point RM*a* associated with magnet RM in line 32, leading to each stage of indicator 4, will be operated on energization of magnet RM. Line 32 will be interrupted to cancel the negative voltage normally biasing the left-hand tube of stage TR and the right-hand tube of stages T1–T4. This method of resetting a ring is well known and is referred to as "cancel bias" in the patent to Haddad et al., U.S. Patent No. 2,551,119, issued May 1, 1951.

It is contemplated that any counter may be used in this invention which produces an unique electrical output for each recording position. A counter, such as a coded binary counter, would be more desirable if a large number of recording positions is to be selected on each form, because it would not require the use of a ring stage for each possibly selected recording position.

The stepping of indicator 4, being occasioned by pulses generated by detector 3, as previously observed, corresponds with a detection of recording position holes *h* on loop 26 each cycle of loop rotation. Indicator 4 may be considered, therefore, a recording position indicator means. The resetting of indicator 4 signifies a transition from one form to a succeeding form. The use of an open ring and a "home" pulse enables identification of each succeeding record form F with a new ring cycle.

Indicator 4 represents, in effect, dynamically circulating information corresponding with detected recording positions on individual record forms F. By connecting each stage T1, T2, T3, and T4, as seen in FIG. 2, through respective output lines A1, A2, A3 and A4 to a related AND gate (viz, 51, 52, 53, and 54) comprising comparing means 5, the "On" condition of the stages of indicator 4 may be individually manifested as an input signal to comparator 5. (Comparator 5 will be more fully described hereinafter.) A signal, for example, emitted from the stage T1 when turned "On," will pass to comparator gate 51 through line A1.

A recording position selector device 1 (FIG. 1) provides a pulse for setting one of a group of selectable switching elements S1, S2, S3 and S4, comprising a recording position selection indicator means 2, to indicate a predetermined count corresponding to a desired recording position. Device 1 may be any suitable means similar to a digit selector shown and described in the patent to Mills et al., U.S. Patent No. 2,531,885, issued November 28, 1950.

In FIG. 1, position selector 1 is shown including card 33 bearing data to be recorded on a form F with column 35 bearing hole 34 in one of 12 possible locations across the width of the card, and being sensed by brush 36 as card 33 moves in the direction of the arrow. Hole 34 represents a reocrding position on record F where data on the card is to be recorded. A timed pulse generated via hole 34 is sent to common brush 37 of commutator 39 for distribution to one of a group of commutator segments 38. The sweep of brush 37 past the commutator segments is synchronized with the feed of card 33 past sensing brush 36. Each commutator segment 38 is associated with a specific hole position of card 33 and a respective selection channel S*c*1, S*c*2, S*c*3, and S*c*4, leading from a related commutator segment 38. Each selection channel is associated with a respective switching element S1, S2, S3, or S4, of selection indicator 2. When brush 37 sweeps past segments 38 and hole 34 is sensed, a circuit will be completed, for example, from the lowest segment shown in FIG. 1 to switching element S4 of indicator 2 through selection channel S*c*4.

The circuit of this embodiment, which uses principally well-known AND, OR and latch circuits, will now be described with reference to FIG. 2. Switching elements S1–S4, which may be conventional latch circuits, have related output lines B1, B2, B3, and B4, for individually passing a signal output to OR gate B5. These output lines are also connected to related AND gates 51, 52, 53, and 54, respectively, of comparator 5 by lines B1*a*, B2*a*, B3*a*, and B4*a*. OR gate B5 supplies a start feed signal output when any one of the switching elements of indicator 2 is set by a pulse from the device 1. The signal from gate B5 will appear on line 48 at AND gate 42 of skip or start feed control circuit 41. Also connected as an input to gate 42 is line 47 from a source developing a carriage-go signal, i.e., from a printer control unit not shown. A coincidence of these signals at gate 42 will supply a start feed signal to set skip latch 43 "On" via line 48*a*, OR gate 44, and line 48*b*. When latch 43 is set, its output on line 48*c* will cause a magnet driver 55 to energize electromechanical clutch 16 to drive shaft 11 with motor M and move platen 12. The carriage-go signal will be generated after printing has occurred to indicate that the carriage may be operated to move form F to a new printing position.

Comparator 5, as previously mentioned, comprises AND gates 51, 52, 53, and 54, and OR gate C5. Each AND gate is connected by one line to a related stage of indicator 4 and by another line to a related switching element of indicator 2. For example, AND gate 51 is connected to trigger stage T1 by line A1 and is connected to switching element S1 by lines B1 and B1*a*. All AND gates of comparator 5 are individually connected by respective lines C1, C2, C3 and C4 to OR gate C5. For example, AND gate 51 is connected by line C1 to OR gate C5. When a signal output from a trigger stage, such as stage T1, coincides at gate 51 of comparator 5 with a signal output from switching element S1 of indicator 2, gate 51 will pass a signal output on line C1 to OR gate C5. A resulting signal output from gate C5 will appear on line 67 at AND gate 71 of stop feed circuit 59 and may be considered a stop feed signal.

A second input necessary at gate 71 is the direct sense signal generated by brush 29 on lines 30 and 66 by contacting drum 23 through a hole *h* in tape loop 26. A direct sense signal appears to be redundant since it must always be present at AND gate 71 if a signal is emitted from gate C5 because brush 29 must have sensed a hole *h* to transfer "On" one of the trigger stages of indicator 4. However, this redundancy is provided for a one-line skip condition described below. Thus, a stop feed signal will pass through gate 71, line 72, and OR gate 73 as one input to AND gate 74.

A second input required at gate 74 is a timing impulse which is generated for each line space on the form. When timing impulses are provided, the brake and detent can be operated at the correct time to stop the form at the proper recording position for printing in the event that holes *h* are not in precise registration. Any suitable means may be used to produce these timing impulses. For example, a commutator 76 is shown secured to shaft 11 in FIG. 1. Electrically energized conductive segments are spaced about the periphery of the commutator and sensed by brush 75 so that an impulse is produced at gate 74 for each line space on form F at the printing station. These regular commutator signals will not pass through gate 74 unless there is coincidence with a stop feed signal from gate 73. Commutator brush 75 is capacitively coupled to the gate to produce a sharply timed signal and to prevent the generation of a lasting signal should brush 75 stop on a commutator segment.

Upon coincidence of a stop feed signal and commutator brush signal at gate 74, an output will be produced on line 77 to set stop latch 78 "On." With latch 78 set, its output on line 79 will cause parallel magnet drivers 62 and 63 to energize detent magnet 21 and brake magnet 22, respectively, to stop carriage feed shaft 11. At the same time stop latch 78 is set, skip latch 43 will be reset "Off" by the signal on line 77, after a delay through element 68 on lines 81 and 80 to deenergize clutch 16. This stop feed signal will also, after having been delayed by element 68, reset a space latch 82 (to be described) and reset all selector switches S1–S4. Delay element 68 merely delays the resetting of latch 43, switches S1–S4, and latch 82 sufficiently to ensure the setting of stop latch 78. A "chase" condition is avoided in which the switches or latch may be reset to remove the input signal to gate 74 before latch 78 has been fully set.

A form feeding control system with which line skipping is accomplished usually must be compatible with single line spacing, since the printing location may not be given for every line of information to be recorded. This is the usual situation in invoice item listing. Therefore, this invention provides for single line spacing when requred by the machine processing stored information. A line space signal will be automatically generated remotely from the carriage control system and will appear only if not overridden by a setting of one of the selector switches. The generation of a line space signal is not a part of this invention; hence, only its effect regarding the skipping control system will be described.

Single line spacing is accomplished in this embodiment by employing AND gate 83, aforementioned space latch circuit 82, OR gate 44, and OR gate 73 in conjunction with the normal skip-stop circuit described above. A line space signal generated remotely will appear at AND gate 83 and will not have any effect until there is coincidence with the carriage-go signal generated at the end of each cycle of operation of the printing mechanism. Upon coincidence of these two signals, space latch 82 is set "On" to, in turn, set skip latch 43 "On," through line 84, OR gate 44, and line 48*b*. Thus, since the carriage-go signal has reset stop latch 78 "Off," clutch 16 will be energized through driver 55 to move shaft 11 and advance form F. The form advance will continue only until commutator brush 75 contacts the next segment of commutator 76 to produce a pulse at AND gate 74. The set condition of space latch 82 will also be coincidently present at gate 74 through line 84 and gate 73 and stop latch 78 will be set "On" through line 77. The signal from gate 74 will reset skip latch 43 and space latch 82 "Off" via line 81 after a delay through element 68. The result is that the carriage will have moved form F a single line space controlled by the distance between adjacent commutator segments. Thus, single line spacing is accomplished without switches S1–S4 of indicator 2 or the triggers stages of indicator 4.

With the structure of the present form of the invention explained, an operating cycle will be discussed. To start a record skip cycle, whether initially or upon termination of a print cycle, one of the switching elements S1–S4 must have been set on signal from selector 1 and a carriage-go signal must be present on line 47. A carriage-go signal appearing on line 47 will have reset stop latch 78 "Off" so that detent 17 and brake 18 will be released. For purposes of illustration, assume an in-process situation wherein a record form F*a* is being fed after printing has occurred in recording position IV with stage T4 of indicator 4 in the "On" condition. Let the advance of a record form F*b*, succeeding record F*a*, be caused by the set condition of switch S2 of position selection indicator 2.

Because loop 26 is synchronously advanced in registration with record F*b*, brush 28 will detect hole R*h* when record F*b* is moved past the home position and a circuit will be completed to energize reset magnet RM. The circuit will be (FIG. 1) from ground, through common brush 23*a*, contact drum 23, hole R*h*, brush 28, reset magnet RM, to plus V. The energization of reset magnet RM causes normally closed contact points RM*a* to open, interrupting cancel bias line 32 leading to each stage of indicator 4. As a result, trigger TR is reset to the "On" condition, while triggers T1–T4 are transferred "Off." Indicator 4 is now reset and conditioned to begin a new cycle of operation. As loop 26 advances with record F*b*, brush 29 riding in channel C*h*1 will detect recording position indicating holes *h*; the first hole will be effective to cause a pulse to be transmitted by line 30 to indicator 4. Trigger TR will be transferred "Off" and trigger T1 will be transferred "On" by the sensing of a first recording position indicating hole I*h*. However, no stop feed signal will be generated in comparator 5 at gate C5 because there is no coincidence between the output of trigger T1 and switch S2. Record feeding will be permitted to continue.

Upon detection of a second recording position indicating hole II*h* by brush 29, a pulse will be sent to indicator 4 in the manner described. Trigger T1 will be transferred "Off" and trigger T2 will be conditioned "On." A signal will appear on line A2 and at gate 52 of comparator 5. Since switch S2 was assumed to have been set initially, there will be a signal on lines B2 and B2*a* as a second input to gate 52. Upon coincidence at gate 52 of signals on lines A2 and B2*a*, a pulse will be propagated through gate C5 to gate 71. Since brush 29 has detected a hole *h* in tape loop 26, a signal will also be present on line 66 to provide coincident signals at gate 71. Therefore, the stop feed signal will appear along line 72, gate 73, and at gate 74. The further progress of the stop feed signal will be blocked until a timed commutator pulse appears across capacitor 85 to coincide with stop feed signal from gate 73. Upon coincidence of these two signals, stop latch 78 is set "On" to energize detent magnet 21 and brake magnet 22 through their respective drivers 62 and 63 on line 79. Detent 17 and brake 18 are operative to stop the rotation of platen 12 and to precisely align the desired printing position on the form before printing means 10. The stop feed signal from gate 74 will simultaneously, with setting stop latch 78, reset skip latch 43 along line 81, and reset space latch 82, which was already "Off," and all switches S1–S4 after a delay through element 68. Printing may now take place at recording position II on form F*b*. It may be mentioned at this point that, when shaft 11 is positioned by detent 17, the effective recording hole *h* will have gone sufficiently beyond brush 29 so that the brush does not contact drum 23 through the effective hole, although it may through an adjacent succeeding recording position hole.

Special conditions may occur in line skipping operations and these will be discussed. A first condition, the one-line skip, is that encountered when a skip operation is signaled, for example, from recording position I to recording position II on a form, but stop brush 29 is in direct contact with drum 23 through tape hole II*h* while printing occurs in position I. Stage T2 will have been transferred "On" by brush 29 in hole II*h*. In this instance, when switch S2 is "On," there is a seeming conflict between skip and stop signals. However, a one-line skip is accomplished. The presence of a signal on line 66 from brush 29 in combination with a signal on line 67 from AND gate 52 through gate C5 from comparator 5 will generate an early stop signal, which will be blocked at AND gate 74 because no commutator pulse is sustained across capacitor 85. Therefore, skip latch 43 may be set by the signal from switch S2 on line 48 and a carriage-go signal on line 47 to engage clutch 16. As soon as the next commutator segment is contacted by brush 75, coincidence of the stop feed signal and a new commutator signal at gate 74 will set stop latch 78 via line 77 to, in turn, energize detent magnet 21 and brake magnet 22. Skip latch 43 and switch S2, will be reset from line 81 with the output from gate 74 after a delay by element 68.

Another condition is that of skipping from a recording position on one form to the same recording position on a succeeding form. For example, after printing occurs at position II on form F*a*, switch S2 is again set "On" prior to moving the carriage. Trigger T2 will still be "On" since it is transferred "Off" only by another hole in channel C*h*1 or a reset hole R*h*. Therefore, coincidence exists in comparator 5 at gate 52 and a stop signal is present at AND gate 71. However, brush 29 will not be sitting in a hole *h* so that the stop feed signal is blocked at gate 71. As soon as brush 29 contacts a hole, indicator 4 will be stepped to trigger T3, destroying coincidence at gate 52 of comparator 5 to remove the stop signal at gate 71. Therefore, if a carriage-go signal was present on line 47, it coincided with a signal on line B2 and line 48 to set skip latch 43 and energize clutch 16 to move platen 12. A stop feed signal will not occur again until coincidence occurs between trigger T2 and switch S2 indicating that the succeeding form F*b* has arrived at recording position II.

The resetting of the trigger ring in indicator 4 will be illustrated by the example of skipping from recording position III on form F*a* to recording position I on form F*b*. During printing at position III on form F*a*, trigger T3 is "On," switch S3 is "Off" having been reset by the stop feed signal, and stop latch 78 is "On." Brush 29 has sensed tape hole III*h* but the hole will have moved slightly beyond the brush when the carriage stopped. Near the end of the printing operation, switch S1 is set "On" and, at the end of printing, a carriage-go signal is produced on line 47. Coincidence occurs at gate 42 to set skip latch 43 "On" and energize clutch 16. No coincidence occurs at the AND gates of comparator 5 so that no stop feed signal is produced. As tape loop 26 is moved, brush 29 will sense tape hole IV*h*, if a hole is present, to set trigger stage T4 "On" and stage T3 "Off." If there was no hole IV*h*, stage T3 would remain "On." As loop 26 continues, brush 28 (FIG. 1) contacts drum 23 through reset hole R*h* to energize magnet RM, as described above. At this time, trigger stage TR is transferred "On" and stages T1–T4 transferred "Off." Therefore, no coincidence in the comparing circuit will have occurred and loop 26 continues until brush 29 senses hole I*h*, corresponding to recording position I on form F*b*. Trigger T1 is transferred "On," stage TR transferred "Off" and, since switch S1 was assumed "On," a coincidence signal will be produced at gate 51, line C1, OR gate C5, and on line 67. Brush 29 is in hole I*h* so that coincidence occurs at gate 71 and the stop feed signal appears on line 72, passes OR gate 73, and appears at gate 74, where it is blocked only until the next commutator pulse is produced across capacitor 85. When this commutator pulse occurs, stop latch 78 is set to energize detent magnet 21 and brake magnet 22. Skip latch 43 and switch S1 will be reset "Off," as previously described.

*Dual Speed Control System*

Figure 4:
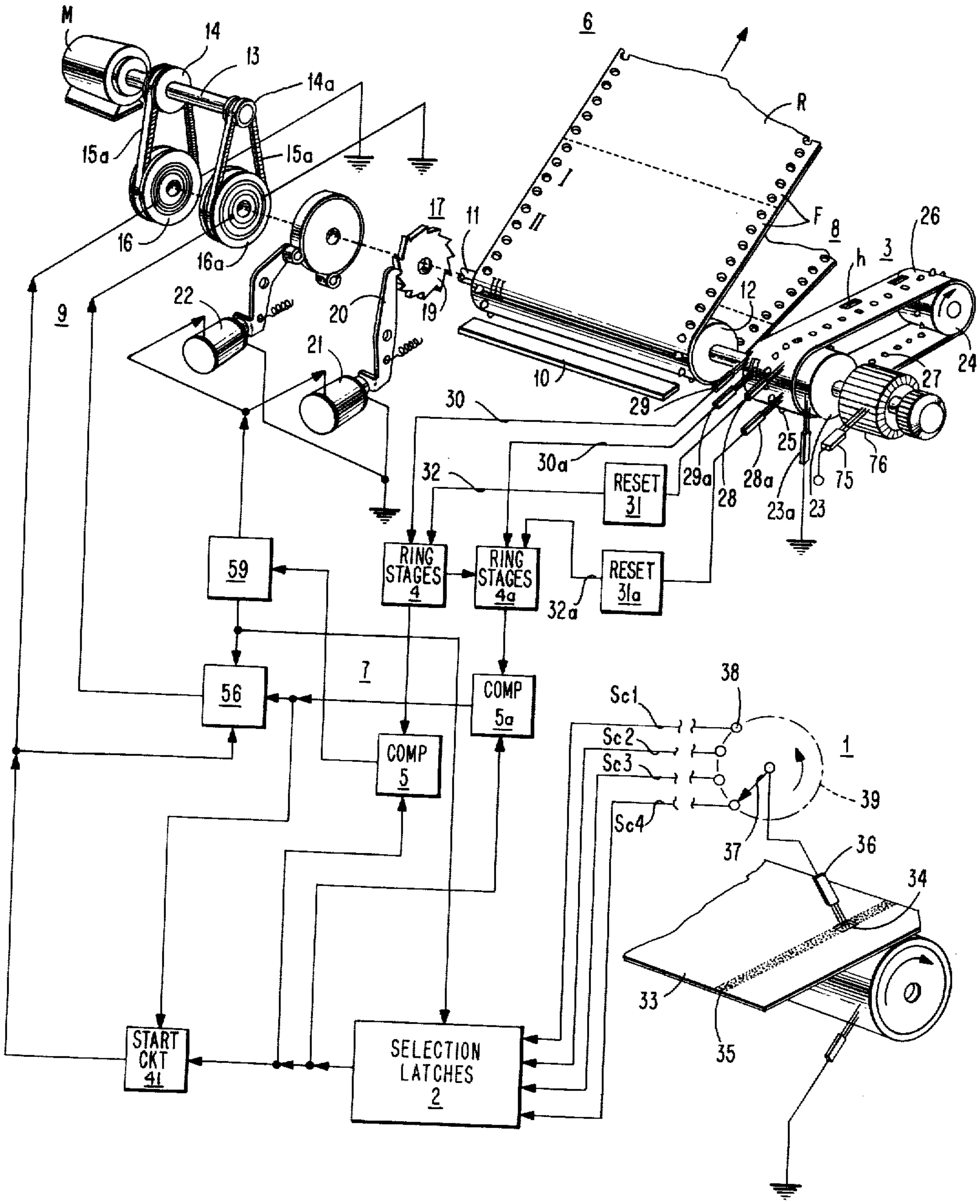
FIGURE 4 is a diagrammatic view of another embodiment of the invention.
Figure 5:
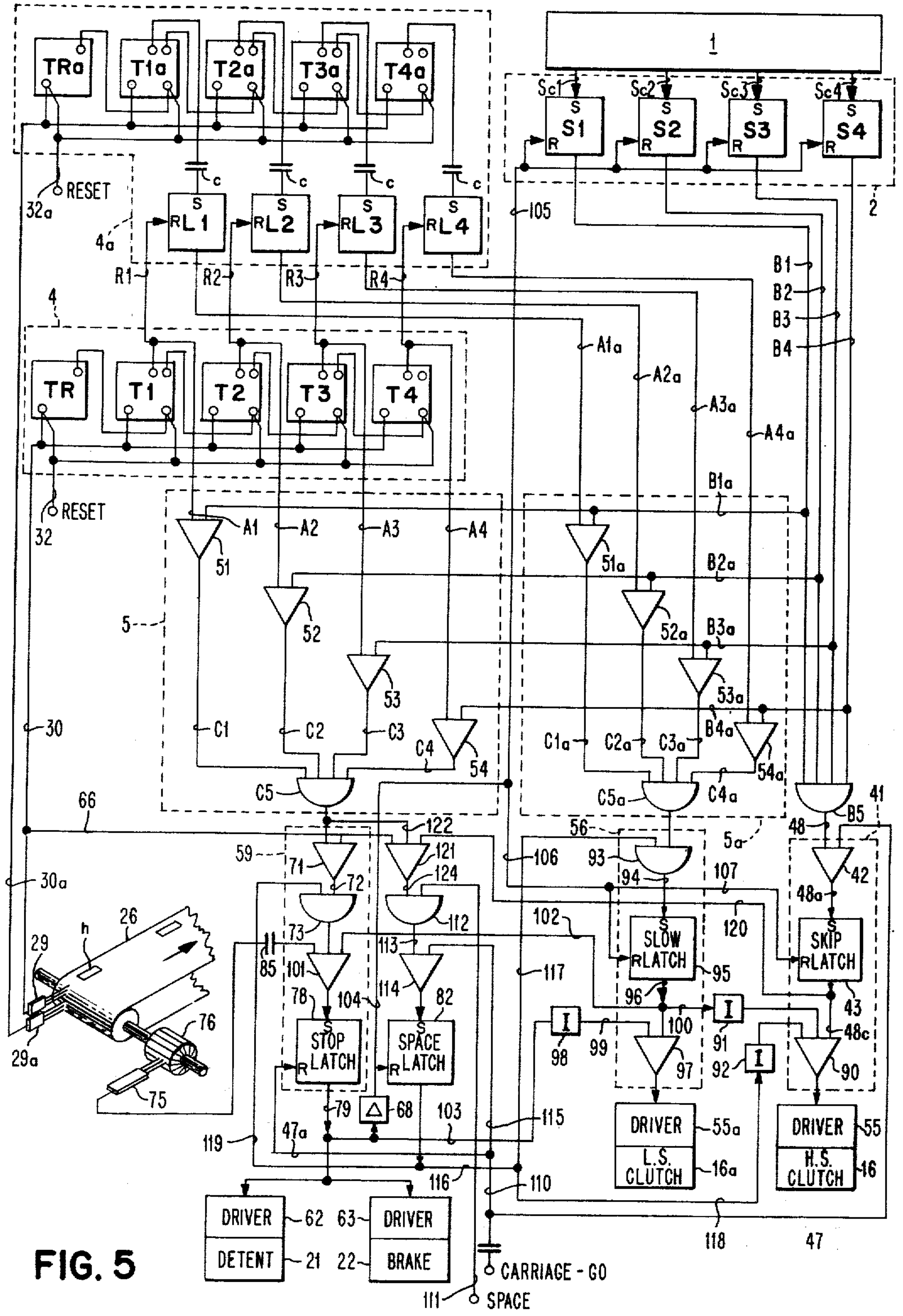
FIGURE 5 is a block diagram of the embodiment of FIG. 4.

Another embodiment of the invention is shown in FIGS. 4 and 5 and is adapted for higher record feed carriage speeds than the first embodiment. The second embodiment includes a two-speed record feed carriage and is adapted for advancing a record between recording positions at either speed, but always using the lower speed when the skip is less than a predetermined distance or as the selected recording position comes within a predetermined approach distance of its stopping position. This embodiment will automatically decelerate the carriage from high speed to low speed before reaching a stopping point. Many of the components and circuits of the first embodiment are also employed in this embodiment and will be identified with the same reference numerals where any similarity occurs.

Referring to FIG. 4, in detector system 3, a second recording position detector brush 29*a*, situated in line with brush 29 and displaced "upstream" relative to motion of loop 26, is provided for early detection of the recording position indicating holes *h* in channel C*h*1. The early detection brush may be placed in advance of the stop brush 29 any number of lines suitable for an application. This placement will determine the distance during which slow feeding will occur. Pulses generated at brush 29*a* by detection of holes *h* are transmitted along line 30*a* to operate ring 4*a* (FIG. 5) in a manner similar to the operation of ring 4, described with reference to FIG. 2. Ring 4*a* is comprised of four effective stages, T1*a*, T2*a*, T3*a*, and T4*a*, together with a home position stage TR*a*. However, while only four effective stages of ring 4*a* are shown, it is to be understood that the number of effective stages is discretionary and dependent on a particular application of the invention, and that coded binary counters can be substituted for the ring circuits. Ring 4*a* differs from ring 4 in that each effective stage is capacitor-coupled through a capacitor "*c*" to a "latch" circuit employed as a memory element in its respective output line. These memory elements are latch circuits designated L1, L2, L3, and L4, and may be comprised of triggers. They are set "On" by a pulse corresponding to the transferred "On" condition of a trigger in ring 4*a* and are reset "Off" by a pulse generated by the transferred "On" condition of a corresponding trigger of ring 4. The set condition of a latch L1–L4 provides a signal as one input to one of a plurality of coincident circuits 51*a*, 52*a*, 53*a*, and 54*a*, comprising comparator network 5*a* similar to comparator network 5 described with reference to FIG. 2. Ring 4*a* is reset at the end of an operating cycle by a second reset brush 28*a*. Brush 28*a* functions in a manner similar to brush 28 described above and operates in circuit 31*a* to cause interruption of cancel bias 32*a*. Brush 28*a* is also "upstream" from brush 28 approximately the same amount as brush 29*a* is from brush 29, to provide an early reset pulse for ring 4*a* relative to the reset pulse from brush 28 for ring 4.

Comparator network 5*a*, operated upon coincidence with a signal from one of the latches L1–L4 and a signal from one of the switches S1–S4, is employed to set a slow speed latch when a recording position approaches within the predetermined distance of the stop position.

When one of the switches of selector 2 is set, a start feed signal will be transmitted along one of the lines B1–B4 to gate B5 as one input to gate 42 on line 48 in start circuit 41. The second input to coincident gate 42 is a carriage-go signal on line 47 applied from a remote source, as previously described. The coincidence of these two signals at gate 42 will permit a signal to pass on line 48*a* to set skip latch 43, which in turn, will provide one input on line 48*c* to AND gate 90. The remaining two inputs to gate 90 are the outputs from inhibit circuits 91 and 92, if there have been no inputs to these inhibit circuits. If either of these inhibit circuits receives an input signal, it will not produce a necessary input to gate 90. Therefore, if all three inputs are present at gate 90, the skip or high speed clutch 16 will be energized from its driver 55 to rotate shaft 11 and platen 12 moving forms F. Tape loop 26 will also move under brushes 29, 29*a*, 28 and 28*a* at high speed.

Brush 29*a*, being displaced a predetermined distance from brush 29, will sense a hole *h* in channel C*h*1 some time prior to brush 29. Upon sensing each hole *h*, brush 29*a* will cause trigger stages T1*a*–T4*a* to be successively transferred "On" and advance ring 4*a*. Each time one of these trigger stages is so transferred, it will set its corresponding latch L1–L4 in the "On" condition. Any latch so set will remain in that condition until reset by a signal from its corresponding trigger stage T1–T4 of ring 4 through a reset line R1, R2, R3, or R4. The coincidence of a signal from one of these latches L1–L4 with a corresponding signal from one of the switches S1–S4 at one of the AND gates 51*a*, 52*a*, 53*a*, and 54*a* will produce an output signal at OR gate C5*a*, which is the slow speed signal and, when effective, will cause the carriage to shift from high speed to low speed until a stop feed signal is produced. For example, if switch S2 had been set near the end of the printing operation to advance the carriage at high speed, slow brush 29*a* will eventually sense a hole *h* representing recording position II*h* in the tape loop 26. Thus, trigger stage T2*a* will be set "On" and, when this occurs, latch L2 also will be set "On." Thus, coincidence of signals will occur on line A2*a* and line B2*a* at AND gate 52*a* in comparator network 5*a*. A signal will be propagated from gate 52*a* through OR gate C5*a* to slow feed circuit 56 and set slow latch 95 "On" through OR gate 93 and line 94. The output of slow latch 95 serves as one input along line 96 to AND gate 97, and if there is no stop latch input signal to inhibit circuit 98, an output will be present on line 99 to coincide with the latch signal on line 96 to produce an input signal to driver 55*a* through gate 97, which will energize low speed clutch 16*a*. When latch 95 is set, its output will serve as an input to inhibit circuit 91, which, in turn, will block the signal from skip latch 43 at gate 90, deenergizing high speed clutch 16.

As platen 12 continues to move forms F and tape loop 26, but at low speed, brush 29 will sense the same holes sensed by early brush 29*a*. Brush 29 will accordingly successively transfer "On" trigger stages T1–T4 in accordance with the number of holes *h* sensed. As each trigger stage of ring 4 is transferred "On," its corersponding latch circuit L1–L4 will be reset "Off." Although one of the latches, which had been providing an input to an AND gate in comparator 5*a*, has been reset, low speed clutch 16*a* will remain operative until stop latch 78 has been set. This occurs because slow latch 95 has not received a reset pulse. If switch S2 is assumed to have been set, for example, brush 29 will sense hole II*h* and transfer trigger T2 of ring 4 "On" and its condition will be manifested on line A2 as one input to gate 52 of comparator 5. Since switch S2 is on, there will be coincidence of input signals at gate 52 so that an output will be propagated along line C2 through gate C5 to AND gate 71 of stop feed circuit 59. A second input at gate 71, that of brush 29 directly sensing drum 23 through a hole *h* in tape loop 26, will also be present; thus, a signal will pass from gate 71 on line 72 through OR gate 73 to AND gate 101. Gate 101, however, requires two additional inputs; one of these inputs is from slow latch 95 when set and present on line 102; the second input is a pulse across capacitor 85 produced by brush 75 contacting a segment of commutator 76, as described for the first embodiment. Therefore, since three inputs are present at gate 101, an output from this gate will be propagated to set stop latch 78. The output from stop latch 78 is present on line 79 to energize detent magnet 21 and brake magnet 22 through their respective drivers 62 and 63. The output from stop latch 78 will also be present on line 103 as an input signal to inhibit circuit 98 to block any further energization of low speed clutch 16*a*; the signal on line 103 will also serve as an input to delay element 68 to cause the resetting of space latch 82 from line 104, switches S1–S4 from lines 104 and 105, slow latch 95 from lines 104 and 106, and skip latch 43 from lines 104, 106, and 107.

The reset pulse for the space, slow and skip latches is delayed to avoid a "chase" condition by premature resetting before dependent latches are set. When a stop latch 78 has once been set, it will remain in that condition until the carriage-go signal is applied over lines 110 and 47*a* to reset the stop latch.

As further illustration, an in-process situation will be described. First, assume that switch S1 of selection indicator 2 has been set "On" near the end of a printing operation. Second, assume that printing has occurred in recording position IV. Thus, stage T4*a* of ring 4*a* and stage T4 of ring 4 accordingly will be in the "On" condition. Latch L4 will be "Off" because stage T4 has been conditioned "On." Under these conditions there will be no signal from latch L4 on line A4*a* and no coincidence of signals at the AND gates of comparator 5*a*; also, there will be no coincidence of signals in comparator 5 between stage T4 and a signal on line B1*a*. The setting of switch S1 will provide a signal on line B1 passing through gate B5 to gate 42. At the end of printing operation, a carriage-go signal will be generated on line 110 and 47*a* to reset stop latch 78 and on line 47 to provide a coincidence signal with the output from gate B5, at gate 42 propagating a pulse on line 48*a* to set skip latch 43 "On" and to provide an output signal on line 48*c* at gate 90. Space latch 82 and slow latch 95 are not set "On," so that inhibit circuits 91 and 92 will provide the necessary inputs for gate 90 to establish a skip signal at driver 55 for high speed clutch 16. Record F*b* will move at high speed and loop 26 will advance synchronously with the record. Reset hole R*h* will be sensed by brushes 28*a* and 28, successively causing circuits 31*a* and 31 to be completed and thus energize their respective reset magnets, which interrupt the cancel bias lines 32*a* and 32 as described above with reference to FIG. 1. Thus, slow ring 4*a* and stop ring 4 will resent in their home positions. Carriage operation continues at high speed until a first recording position hole I*h* in channel C*h*1 on loop 26 is detected by brush 29*a* causing stage T1*a* to be transferred "On." Latch L1 will also be set, thus providing a signal on line A1*a*. Coincident signals will occur at gate 51*a* to propagate an output signal through gate C5*a* and gate 93 along line 94 to set slow latch 95. Latch 95 will provide an output signal on line 96 to gate 97, and since the stop latch 78 is not energized, inhibit circuit 98 will provide a coincident signal on line 99 so that a slow signal is supplied through gate 97 to energize clutch 16*a* through its driver 55*a*. The output from the slow latch will also provide an input to inhibit circuit 91 to remove one of the necessary coincident signals at gate 90, causing high speed clutch 16 to be deenergized.

Form F*b* and tape loop 26 will now proceed at reduced speed until brush 29 contacts recording position hole I*h*. The detection of this hole by brush 29 transfers stage T1 to the "On" condition to reset latch L1 and also provide an output signal on line A1 at gate 51 of comparator 5. This output is coincident with the signal from switch S1 on line B1*a* providing a signal on line C1, at gate C5 and further as an input to gate 71. Since brush 29 is sensing hole I*h* a signal will be present on lines 30, 66 as the remaining input to gate 71, permitting the stop feed signal to appear on line 72 at gate 73, and as an input to gate 101; slow latch 95 is still "On" and its output will appear on line 102 as a second input to gate 101; the third input will be a pulse across capacitor 85 generated by commutator brush 75. Gate 101 will now produce a pulse to set stop latch 78 and energize detent magnet 21 and brake magnet 22 through their respective drivers on line 79. The setting of stop latch 78 will prevent slow speed clutch 16*a* from being energized because of the input on line 103 to inhibit circuit 98. Space latch 82, slow latch 95, skip latch 43, and indicator switches S1–S4 will all be reset by a delayed pulse from stop latch 78 through delay element 68. Printing may now occur in recording position I on form F*b*.

If it is now assumed that switch S3 of indicator 2 is next set by device 1, a signal will be present on line B3 and at gate 42, and on line B3*a* at gates 53*a* and 53. The occurrence of a carriage-go signal will reset stop latch 78 via lines 110 and 47*a*, and coincide with the signal at gate 42 to set skip latch 43. There are no inputs to inhibit circuits 91 and 92 to block gate 90, so high speed clutch 16 will be energized to advance form F*b* toward recording position III. Brush 29*a* will sense indicating holes II*h* to step ring 4*a* to stage T2*a* and set latch L2, but no slow feed signal will be generated because line B3*a* is energized. Brush 29 will also sense hole II*h* to step ring 4 to stage T2 causing latch L2 to be reset, but no coincidence occurs at comparator 5 to generate a stop feed signal.

When hole III*h* is detected by brush 29*a*, ring 4*a* is stepped to stage T3*a* setting latch L3 to generate a slow feed signal at gate 53*a* to set slow speed latch 95. No stop latch output is present on line 103 to inhibit gate 97 through circuit 98. Therefore, slow speed clutch 16*a* will be energized and high speed clutch 16 deenergized because of inhibited gate 90. Brush 29 will subsequently sense hole III*h* and advance ring 4 to stage T3, resetting latch L3 and providing a signal at gate 53 coincident with the signal on line B3*a* to partially condition gate 71. Brush 29 is in hole III*h* so line 66 will completely condition gate 71 to propagate an output along line 72 through gate 73 to gate 101. One necessary signal for gate 101 is present on line 102 since slow latch 95 is set and the remaining required signal is produced by commutator brush 75. Therefore, stop latch 78 will be set and the detent and brake magnets energized to stop the carriage with form F*b* registered for printing at position III.

The latches associated with ring 4*a* have the functional importance of providing a memory of the transferred condition of successive trigger stages of indicator 4*a* while the trigger stages themselves may be advanced or reset. The importance of these latches may be demonstrated by considering two special conditions: (1) the spacing between successive holes *h* in channel C*h*1 on loop 26 is less than the distance between brushes 29*a* and 29; and (2) the spacing between a last hole *h* in channel C*h*1 on loop 26 and reset hole R*h* in channel C*h*2 is less than the distance between brushes 29*a* and 29.

Figure 6:
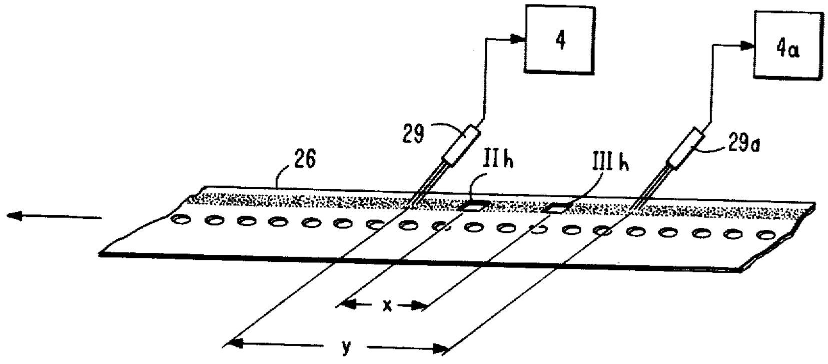
FIGURE 6 is a diagram of a special condition respecting recording position holes and the brush sensing system associated with the embodiment of FIG. 4.

As to the first special condition, reference is made to FIGS. 5 and 6. In FIG. 6 the spacing "*x*" between hole II*h* and hole III*h* on loop 26 is seen to be less than the distance "*y*" between brush 29*a* and brush 29. Brush 29*a* has already detected holes II*h* and III*h* before brush 29 has sensed either of these holes. The detection of hole I*h* (not shown) will have caused stage T1*a* of ring 4*a* and stage T1 of ring 4 to be transferred to the "On" condition. Then, on detection of holes II*h* and III*h* by brush 29*a*, the transferred "On" condition of stage T1*a* will have been stepped first to stage T2*a*, then to stage T3*a*. Latches L2 and L3, associated wtih these respective stages, will be successively set and will both remain so until reset by the appropriate stage of ring 4. If, for example, switch S2 is assumed to have been previously set, signals from latch L2 and switch S2 will coincide at gate 52*a* to set the slow speed latch to effect a carriage deceleration from high to low speed. Subsequently, as loop 26 advances, hole II*h* is detected by brush 29 to generate a pulse to step ring 4 from stage T1 to stage T2. A signal on line R2 from stage T2 resets latch L2. A signal from stage T2 of ring 4 on line A2 will coincide with a signal on line B2*a* at gate 52 to produce a stop feed signal.

Throughout this action, latch L3 has remained in the set condition, emitting a signal to partially condition gate 53*a*. Assume now that switch S3 is turned "On" by selector 1 during printing in recording position II. A signal from switch S3 will appear at gate B5 and gate 42; the signal will also be present on line B3*a* where it will coincide with the signal on line A3*a* from latch L3 to produce a slow feed signal at gate C5*a*, gate 93, line 94, and set slow speed latch 95. The set condition of slow speed latch 95 will produce an input to exhibit circuit 91 and block gate 90 to prevent energization of the high speed clutch when printing is completed in recording position II. Upon completing the printing operation at position II, a carriage-go signal will reset stop latch 78 and also condition gate 42 to generate a high speed signal and set skip latch 43. However, as soon as stop latch 78 has been reset, no input signal will appear on line 103 for inhibit circuit 98 so that gate 97 will be conditioned to propagate the slow feed signal from lines 99 and 96 to energize low speed clutch 16*a*. Thus, since the selected recording position had already been indicated by ring 4*a*, the high speed skip was inhibited and the carriage started at low speed. Latch L3 remains set until brush 29 senses hole III*h* to set stage T3 of indicator 4, when coincidence of signals at gate 53 will produce a signal to set stop latch 78 and stop the carriage as described above. From this illustration it can be seen that if any selected recording position has already been sensed by the early detection brush 29*a*, the information will be stored by latch circuits L1–L4; and should one of these positions be called for in a skip operation the carriage will advance only in slow speed. Trigger stages T3*a* and T3 will remain "On" until hole IV*h* is sensed by brushes 29*a* and 29, or until hole R*h* is sensed by brushes 28*a* and 28 to cause resetting of the ring circuits 4*a* and 4.

Figure 7:
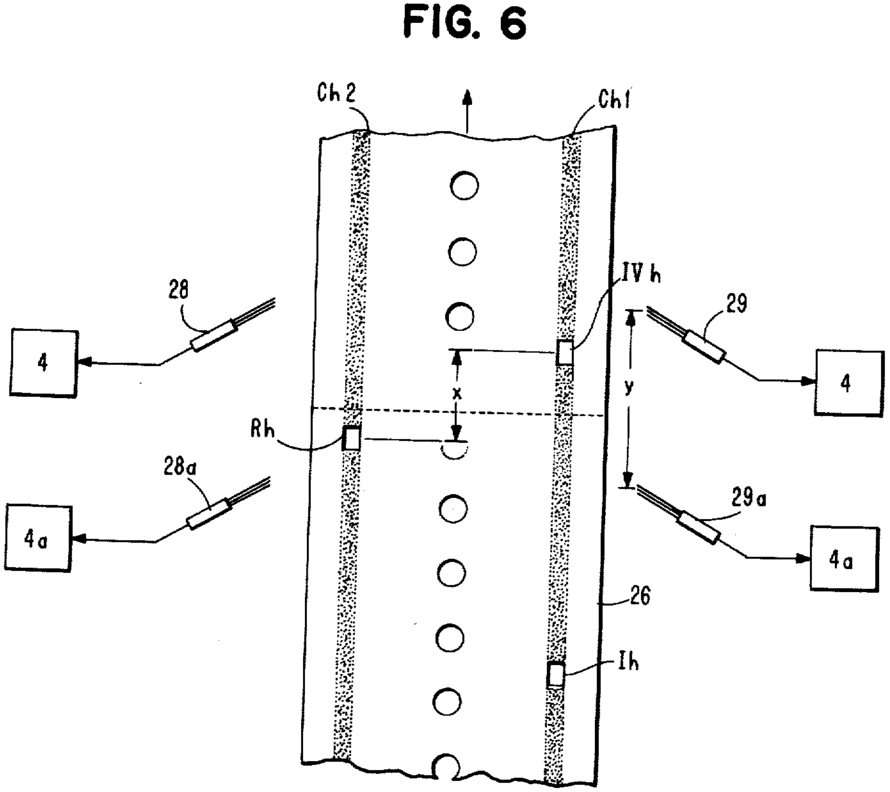
FIGURE 7 is a diagram of a special condition respecting a recording position hole and a reset hole and the brush sensing system of the embodiment of FIG. 4.

As to the second special condition, reference is made to FIGS. 5 and 7. In FIG. 7, the spacing "*x*" between the last hole IV*h* in channel C*h*1 of loop 26 and reset hole R*h* in channel C*h*2 is less than the distance "*y*" between brush 29*a* and brush 29. A condition will exist for a time in which hole IV*h* has been detected by slow brush 29*a* but not yet detected by stop brush 29; during this time reset hole R*h* will be detected by slow ring reset brush 28*a* after slow brush 29*a* has detected hole IV*h*.

If switch S4 is assumed to have been set following a setting of S3, the detection of hole IV*h* by brush 29*a* results in transferring ring 4*a* from stage T3*a* to stage T4*a*. Latch L4 will be set and signals from lines A4*a* and B4*a* will coincide at gate 54*a* to set slow latch 95. A carriage-go signal on lines 110 and 47*a* will reset stop latch 78, removing the inhibition at gate 97 so that the carriage will proceed at slow speed. As soon as tape loop 26 begins to move, brush 28*a* will sense hole R*h* and reset ring 4*a*. Latch L4 remains set, however, until hole IV*h* is detected by brush 29 to stop the carriage; as stage T4 is conditioned "On," a signal on line R4 resets latch L4. This memory of the transferred condition of stage T4*a* by latch L4 enables ring 4*a* to be reset to its home stage while providing an enduring signal output from latch L4 for maintaining a signal on line A4*a* at gate 54*a* for comparison with the signal on line B4*a* from switch S4 to cause generation of the slow feed signal. Stage T4 of ring 4 will remain "On" until tape loop 26 is again moved so that brush 28 senses hole R*h*, causing ring 4 to be reset via line 32.

Provision is also made in this embodiment, as in the first embodiment, for single line spacing. The space signal is generated remotely and is supplied on line 111 to the carriage control system in the absence of a selector signal from one of the switches S1–S4. When a space signal is generated, it will appear on line 111, at OR gate 112, on line 113 and at AND gate 114. Upon coincidence with a carriage-go signal on line 115 at gate 114, space latch 82 will be set "On." The resulting space latch output signal will be present on lines 116 and 117 to set slow latch 95 through 93 and line 94; the space latch signal will appear on lines 116 and 118 as an input to inhibit circuit 92 to block any skip signal at gate 90; and the latch signal will appear at gate 101 via lines 116 and 119 and gate 73. Stop latch 78 will not be set, however, from gate 101 until a commutator signal is also present with the output signal on line 102 from the already set slow latch. Since stop latch 78 was reset by the carriage-go signal, gate 97 is not inhibited by circuit 98 and the slow speed clutch will be energized by the output of slow latch 95. As soon as the next commutator line pulse is generated at brush 75 by carriage movement, gate 101 will propagate a signal to set stop latch 78 and result in energizing detent magnet 21 and brake magnet 22, while inhibiting gate 97 throuh circuit 98. A delayed stop signal from element 68 resets slow latch 95. Thus, the carriage and form will have advanced a single line space.

As with the first embodiment, examples of skipping situations will be described. One example is encountered when the carriage has been stopped either by single line spacing or a skipping operation so that brush 29 is resting in the next position called for by a skip signal. If recording position II is being printed, brush 29 would normally be isolated from drum 23; but, because tape hole III*h* is adjacent the current printing position, brush 29 may be resting in that hole. When a skip to recording position III is signaled, switch S3 will be set "On" and trigger stage T3 will have been transferred "On" by brush 29. The result is that a stop signal is present at gate 101, having passed through gate 53, line C3, gate C5, gate 71 because brush 29 is in a hole, line 72 and gate 73. When a carriage-go signal exists on line 47, skip latch 43 will be set "On." The setting of the skip latch provides a signal at AND gate 121 via line 120; that signal coincides with a stop signal on line 122 from gate C5 and with a brush signal on line 66 from brush 29 at gate 121. Gate 121 will propagate a signal on line 124 through gate 112 and line 113 to coincide with the carriage-go signal at gate 114. Space latch 82 is set and, as a result, inhibits the skip signal at gate 90 via line 116 and 118, and sets slow latch 95 via line 116, 117, gate 93 and line 94. Since there is no commutator signal, as yet, across capacitor 85, stop latch 78 is not set so the slow latch signal is not inhibited at gate 97, permitting slow clutch 16*a* to be energized. With the next line commutator signal, stop latch 78 is set to inhibit slow speed clutch 16*a* and reset space latch 82, slow latch 95, and skip latch 43. Thus, the carriage will have moved the necessary one line in response to conflicting skip and stop signals.

Another skipping instruction may be to skip from printing position II on form F*a* to printing position II on form F*b*. In this instance, stage T2 of ring 4 will be "On" and, before the end of printing, switch S2 will be set "On." At carriage-go time, skip latch 43 will be set and no inhibitions will occur at gate 90, so a high speed skip will occur. The stop signal from comparator 5 was blocked at gate 71 because brush 29 was not sitting in a tape hole. If brush 29 had been sensing a hole, such as the next hole III*h*, stage T3 of ring 4 would be on to destroy coincidence at comparator 5.

From the foregoing account, it will be observed that high speed feeding will exist when the spacing between successively selected holes *h* in channel C*h*1 on loop 26 is greater than the distance between brush 29*a* and brush 29. Low speed feeding will exist in all cases before stopping the carriage, and when the spacing between successively selected holes *h* on loop 26 is less than the distance between brush 29*a* and brush 29.

While the invention has been particularly shown and described with reference to preferred embodiments thereof, it will be understood by those skilled in the art that various changes in form and details may be made therein without departing from the spirit and scope of the invention.

I claim:

1. In apparatus for controlling a record feeding mechanism as it feeds a record form before a recording device, said form having a plurality of recording positions thereon:

selector means presettable to indicate a particular recording position count;

an endless looped member related to said mechanism so as to be driven thereby synchronously with said form, said member having a single channel of serially arranged indicia thereon with each indicium representing a recording position;

indicator means for sensing said indicia and for indicating a count of said recording positions;

and coincident means for comparing the count of said indicator means with the count of said selector means and for issuing a control signal when equal counts exist.

2. Apparatus as described in claim 1 further comprising:

means controlled by said control signal for stopping said record feeding mechanism.

3. Apparatus as described in claim 1 further comprising:

reset means operable in response to said control signal for resetting said selector means.

4. In a control system for advancing a record form having a plurality of recording positions thereon to selectively locate said positions before a device for recording data:

feeding means for moving said form;

selector means for indicating a preselected one of said positions to receive said data; a flexible looped member having indicia arranged serially thereon in a single channel with each indicium corresponding to a different one of said recording positions;

means for moving said member synchronously with said form;

means for sensing said indicia and for providing an unique indication of the arrival of each said position before said device;

means for comparing said position arrival indications with said preselected indication;

and means controlled by said comparing means for stopping said feeding means when an arrival indication coincides with said preselected indication.

5. The device of claim 4 further comprising, in combination:

means actuated by said controlled means for automatically resetting said selector means when said coincidence of indications occurs.

6. In apparatus for controlling a record feeding mechanism as it feeds record forms before a recording device, each form having a plurality of recording positions thereon:

selector means presettable for indicating a particular recording position count;

a flexible member bearing a single channel of serially arranged indicia thereon, each indicium being representative of a recording position on said form, and a reset indicium representing an end of recording positions for each form;

feeding means for moving said member and said form in synchronism;

indicator means for sensing said serially arranged indicia and for indicating a count of the arrival of said recording positions before said device;

comparing means for comparing the count of said indicator means with the count of said selector means and for issuing a signal when equal counts exist;

means controlled by said signal for stopping said feeding means;

and sensing means activated upon sensing said reset indicium for removing all count indication from said indicator means.

7. In a control system for selectively positioning a record form before a device for recording data, each said form having a plurality of recording positions thereon:

selector means for indicating the preselection of a position to receive said data;

a flexible member coextensive with the length of said form and bearing a single channel of serially arranged indicia thereon, each indicium being representative of a recording position on said form;

feeding means for moving said member and said form in synchronism;

means for sensing said indicia and uniquely indicating the arrival of each said position before said device;

means for comparing said arrival indications with said preselection indication;

and means controlled by said comparing means for stopping said feeding means when an arrival indication coincides with said preselection indication.

8. In a control system for selectively positioning a record form before a recording device, said form having a plurality of data recording position thereon:

selector means for indicating the preselection of a recording position count;

a member bearing a single channel of serially arranged indicia representing each of said plurality of recording positions;

feeding means for moving said member and said form together in synchronism;

means for sensing said indicia and for counting the arrival of each of said positions before said device;

means for comparing said arrival count with said preselection count and for producing a signal when equal counts exist;

means for producing a series of timing impulses;

and means responsive to the coincidence of a timing impulse and said signal for stopping said feeding means.

9. In a device of the class described:

record feeding means for advancing a record through a plurality of recording positions;

detector means including a flexible member adapted for movement synchronously with said advancing record and bearing thereon a single channel of indicia, each indicium corresponding to a recording position, and a sensing means for sensing said indicia and for producing a pulse for each indicium;

a series of pulse responsive elements coupled together in tandem relationship and adapted to be successively switched on by the pulses from said sensing means for producing recording position arrival signals indicating the progress of said advancing record;

a plurality of selector switches respectively identified with said recording positions and each one of said plurality of switches corresponding with a different one of said pulse responsive elements, each of said switches being adapted, when set, for producing a recording position selection signal;

means for determining the coincidence of a selection signal from a set selector switch with an arrival signal from a pulse responsive element corresponding to said set switch, and for producing a control signal when said coincidence occurs;

and means controlled by said control signal for stopping said feeding means.

10. In apparatus for controlling a record feeding mechanism as it feeds a record before a recording device, said form having a plurality of recording positions thereon:

selector means presettable to indicate the particular recording position count;

an endless flexible member having a single channel of serially arranged indicia thereon, each indicium representing one of said recording positions;

feeding means for moving said form and said member in synchronism;

means for effecting a movement of said feeding means at high speed;

first indicator means for sensing said indicia and for registering a count of said recording positions;

first comparing means for comparing the count of said first indicator means with said presettable count and for generating a slow signal when equal counts exist;

means controlled by said slow signal for moving said feeding means at slow speed;

second indicator means for sensing said indicia and for registering a count of said recording positions;

second comparing means for comparing the count of said indicator means with said presettable count and for generating a stop signal when equal counts exist;

and means controlled by said stop signal for stopping said feeding means.

11. Apparatus as described in claim 10, further comprising:

reset means operable in response to said stop signal for resetting said selector means.

12. In a device of the class described:

a two-speed record feeding means for advancing a record at either low speed or high speed through a plurality of recording positions;

detector means for generating a first pulse and a second pulse as said record moves to each of said recording positions;

first indicator means operated by said first pulses from said detector means and adapted to be advanced thereby for providing an indication of the recording position which the record is approaching;

second indicator means operated by said second pulses from said detector means and adapted to be advanced thereby for providing an indication of the recording position at which the record has arrived;

settable means for preselecting one of said recording positions;

first comparator means for comparing the indications of said first indicator means with the setting of said settable means and for generating a slow signal on agreement of one of said approach indications with the setting of said settable means;

second comparator means for comparing the indications of said second indicator means with the setting of said settable means and for generating a stop signal on agreement of one of said arrival indications with the setting of said settable means;

means for initiating a high speed operation of said record feeding means;

means controlled by said slow signal for shifting said record feeding means from said high speed to low speed;

and means controlled by said stop signal for stopping said record feeding means.

13. In a device of the class described:

a two-speed record feeding means for advancing a record at either low or high speed through a plurality of recording positions;

detector means including an endless flexible member on said feeding means adapted for synchronous movement with said advancing record and bearing thereon a single channel of indicia corresponding with said recording positions, and a pair of fixed sensing elements, each sensing said indicia and producing a pulse for each indicium;

first indicator means operated by pulses from one of said sensing elements and adapted to be advanced thereby for providing a count indication of each recording position which the record is approaching;

second indicator means operated by pulses from the other of said sensing elements and adapted to be advanced thereby for providing a count indication of each recording position at which the record has arrived;

settable means for indicating a preselected count corresponding to one of said recording positions;

first comparing means for comparing the count of said first indicator means with the count of said settable means and generating a slow signal when equal counts exist;

second comparing means for comparing the count of said second indicator with the count of said settable means and for generating a stop signal when equal counts exists;

means for initiating a high speed operation of said record feeding means;

means controlled by said slow signal for shifting said record feeding means from said high speed to low speed;

and means controlled by said stop signal for stopping said record feeding means.

14. A device as described in claim 13 wherein said first indicator means includes a plurality of pulse responsive elements coupled together in tandem relationship adapted to be successively switched on by pulses from said one sensing element;

and wherein said second indicator means includes a plurality of pulse responsive elements coupled together in tandem relationship adapted to be successively switched on by pulses from said other sensing element.

15. In a control system for selectively positioning a record form before a device for recording data, said form having a plurality of recording positions thereon:

two-speed feeding means for moving said form before said device at either a low speed or high speed;

a flexible member bearing a single channel of serially arranged indicia thereon, each indicium being representative of a recording position on said form;

means for advancing said member and said form in synchronism;

selector means for indicating the preselection of a recording position to receive said data;

first indicator means for presensing said indicia and for providing an unique indication for each recording position approaching within a predetermined distance of said device;

first comparing means for comparing the approach indications of said first indicator means with said preselection indication and for producing a slow signal when one of said approach indications coincides with said preselection indication;

second indicator means for sensing said indicia subsequently to said first indicator means and for providing an unique indication for each recording position arriving at said device;

second comparing means for comparing the arrival indications of said second indicator means with said preselection indication and for producing a stop signal when one of said arrival indications coincides with said preselection indication;

means for initiating a high speed operation of said feeding means;

means responsive to said slow signal for initiating a low speed operation of said feeding means;

means controlled by said stop signal for stopping said feeding means;

and means for inhibiting said high speed initiating means when a slow signal is produced.

16. Apparatus as described in claim 15 wherein said first indicator means includes:

a series of indicator elements, each settable by a sensed indicium for indicating the arrival of particular recording positions within said predetermined approach distance;

a plurality of memory elements, each settable by a different one of said indicator elements, when set, for indicating the presence of a particular recording position within said predetermined approach distance, each said memory element having means for resetting the same;

means connecting said memory elements to said second indicator means for resetting each said memory element successively as its said recording position arrives at said device;

and means connecting each said memory element to said first comparing means, for providing approach indications at said first comparing means, whereby said memory elements provide indications for all recording positions present within said predetermined approach distance but not yet arrived at said device.

References Cited in the file of this patent

UNITED STATES PATENTS

| | | |
|---|---|---|
| 2,684,746 | Bakelaar et al. | July 27, 1954 |
| 2,863,549 | Kelly | Dec. 8, 1958 |

UNITED STATES PATENT OFFICE
CERTIFICATE OF CORRECTION

Patent No. 3,094,261 June 18, 1963

Thomas W. Thompson

It is hereby certified that error appears in the above numbered patent requiring correction and that the said Letters Patent should read as corrected below.

Column 3, line 43, for "ever" read -- even --; column 4, line 35, for "T1-T2" read -- T1-T4 --; column 5, line 15, for "reocrding" read -- recording --; column 6, line 9, for "A." read -- A --; column 11, line 49, for "resent" read -- be reset --; column 13, line 16, for "exhibit" read -- inhibit --; column 14, line 21, for "throuh" read -- through --.

Signed and sealed this 31st day of March 1964.

(SEAL)
Attest:

ERNEST W. SWIDER
Attesting Officer

EDWARD J. BRENNER
Commissioner of Patents